United States Patent [19]
Ahn et al.

[11] Patent Number: 5,822,355
[45] Date of Patent: Oct. 13, 1998

[54] DUAL CAVITY LASER

[75] Inventors: Joon-Tae Ahn, Daejeon; Kyu-Seok Lee, Seoul; El-Hang Lee, Daejeon, all of Rep. of Korea

[73] Assignee: Electronics and Telecommunications Research Institute, Daejeon, Rep. of Korea

[21] Appl. No.: 708,498

[22] Filed: Sep. 5, 1996

[30] Foreign Application Priority Data

Dec. 21, 1995 [KR] Rep. of Korea ................... 95-53662

[51] Int. Cl.⁶ ....................................................... H01S 3/08
[52] U.S. Cl. .............................. 372/97; 372/25; 372/26; 372/18
[58] Field of Search .............................. 372/92, 97, 98, 372/26, 18

[56] References Cited

U.S. PATENT DOCUMENTS 5,642,375  6/1997  King et al. ................................ 372/97
5,644,589  7/1997  Znthon ...................................... 372/97

OTHER PUBLICATIONS

Bethea;"Megawatt Power at 1.319 in Nd:YAG and Simultaneous Oscillation at Both 1.06 and 1.318." IEEE Jour. of Quant. Elect. Feb.,1973.

*Primary Examiner*—Leon Scott, Jr.
*Attorney, Agent, or Firm*—Nixon & Vanderhye, P.C.

[57] ABSTRACT

A dual cavity laser having a positively mode-locked structure capable of double increasing the repetition rate of output light. The dual cavity laser includes an amplitude modulator to simultaneously generate two modulating signals with opposite phases. The dual cavity laser has a simply modified structure from that of the conventional single cavity laser to have two resonators, so that it can have a repetition rate corresponding to two times that of the single cavity laser. One of the resonators may have an adjusted optical property so as to obtain two kinds of output optical pulses with different optical properties.

19 Claims, 2 Drawing Sheets

DUAL CAVITY LASER

BACKGROUND OF THE INVENTION

1. Field of the Invention

The present invention relates to a dual cavity laser adapted to doubly increase the repetition rate of output light, and more particularly to a dual cavity laser having a positively mode-locked structure capable of double increasing the repetition rate of output light.

2. Description of the Prior Art

Typically, Fabry-Pérot interferometers are interference systems including two parallel, partially reflecting mirrors. Each mirror has an optically perfect plane surface and a high reflectivity. When a light source is viewed through such an interference system, sharp interference patterns having the form of concentric circles are exhibited due to the multiple reflection of light between two mirrors. In particular, such an interference system is used to analyze the optical spectrum of light.

On the other hand, Fabry-Pérot resonators are optical resonators having a pair of reflecting surfaces arranged in such a manner that their optical axes are accurately aligned with each other. Each reflecting surface has a high reflectivity. Fabry-Pérot resonators using spherical reflecting mirrors are usually used as optical resonators in most of lasers.

In particular, confocal Fabry-Pérot resonators are widely used in laser oscillators. Such confocal type Fabry-Pérot resonators include a pair of identical spherical reflecting mirrors having a common focal point on their optical axes.

FIG. 1A shows the arrangement of a conventional single cavity Fabry-Pérot laser for active mode-locking.

Typically, laser consists of three parts, namely, a gain medium, a pumping unit for a population inversion in the gain medium, and a resonator constituted by two parallel mirrors. In FIG. 1A, the reference numeral 11 denotes an amplifier consisting of the gain medium and pumping unit. The resonator is indicated by a pair of mirrors M10 and M11. The amplitude modulator, which is denoted by the reference numeral 12, is disposed in the resonator in order to achieve an active mode locking.

If one of two mirrors has a reflectivity less than 100% at the wavelength of oscillating light, the laser beam is usually coupled out from the resonator through that mirror.

In order to increase the peak power of the laser by active mode-locking, the amplitude modulator 12 which periodically modulates the loss of light should be provided in the resonator.

FIG. 1B shows a periodic loss of light induced in the resonator by the amplitude modulator with the periodicity of T. FIG. 1C shows the timing between the mode-locked optical pulses and the loss generated by the amplitude modulator.

Referring to FIGS. 1B and 1C, it can be found that optical pulses are generated at the minima of the loss of light.

The brief description of the principle of the mode locking is as follows.

When the loss of light is periodically modulated, mode-locked pulses are generated at every minima of the periodic loss. Such a mode locking condition can be obtained by driving the amplitude modulator 12 at the round trip frequency(1/T Hz) of the resonator or its harmonic frequencies.

In accordance with the principle of the active mode locking, optical pulses are generated at a repetition rate identical to the driving frequency of the amplitude modulator. As a result, it is impossible to obtain two kinds of output pulses with different optical properties from the conventional laser cavity. The conventional laser is also more or less inconvenient when it is applied to a variety of technical fields such as optical communications and optical sensors.

SUMMARY OF THE INVENTION

Therefore, an object of the invention is to provide a dual cavity laser including a dual resonator arrangement capable of not only doubly increasing the repetition rate of output pulses, but also obtaining two kinds of output pulses with different optical properties.

In accordance with the present invention, this object is accomplished through a cavity laser comprising a pumping unit adapted to achieve population inversion of a gain medium, further comprising: first reflecting means for reflecting light; second reflecting means arranged in parallel to the first reflecting means; third reflecting means arranged in parallel to the first reflecting means; amplifying means arranged between the first and second reflecting means and between the first and third reflecting means, the amplifying means consisting of the gain medium and the pumping unit; and amplitude modulating means arranged between the first and second reflecting means and between the first and third reflecting means while being connected to the amplifying means in series to provide a pair of resonators, the amplitude modulating means adapted to periodically modulate a loss of light for the active mode-locking so as to increase the peak power of the laser output.

In accordance with a preferred embodiment of the present invention, the independent resonators produce two kinds of optical pulses with the same repetition rate, but shift each other with a half period of each pulse train.

Accordingly, where laser output is obtained through the reflecting means arranged at the side of the gain medium which the resonators hold in common, the repetition rate of output optical pulses becomes double the driving frequency of the amplitude modulating means.

Where the optical properties of one of the resonators are appropriately adjusted, relative characteristics of two output pulses become different from each other. For example, when the birefringence of one resonator is changed, it is possible to obtain two kinds of optical pulses with different states of polarization. Thus, it is possible to generate two kinds of optical pulses with different characteristics as optical properties of the resonators are appropriately adjusted.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 2A:
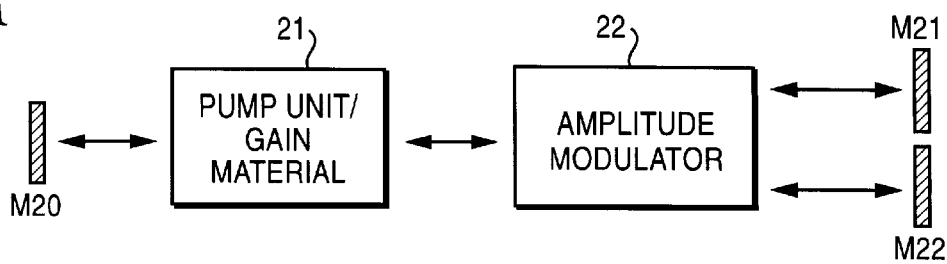
FIG. 2A is a schematic view illustrating a dual cavity Fabry-Pérot laser according to the present invention.

FIG. 2A shows a dual cavity Fabry-Pérot laser according to the present invention.

As shown in FIG. 2A, the dual cavity laser of the present invention includes an amplitude modulator 22 for simultaneously generating two modulating signals with opposite phases, an amplifier 21 as a gain medium, and at least three reflecting means, for example, mirrors constituting a dual resonator.

The gain medium 21 is disposed at the input terminal side of the amplitude modulator 22. The mirror M20 is coupled to the gain medium 21 whereas the remaining mirrors M21 and M22 are coupled to two output terminals of the amplitude modulator 22, respectively.

A selected one of the three mirrors has a reflectivity less than 100% so that output light can be obtained through the selected mirror.

In order to increase the pulse repetition rate, output pulses should be obtained through the mirror M20 disposed at the side of the gain medium 21.

In FIG. 2A, the arrows indicated within the resonator express the paths of light beams oscillating in the resonator.

In accordance with the present invention, a dual resonator structure is obtained. One resonator consists of the mirror M20, amplifier 21, amplitude modulator 22 and mirror M21 whereas the other resonator consists of the mirror M20, amplifier 21, amplitude modulator 22 and mirror M22.

Figure 1A:
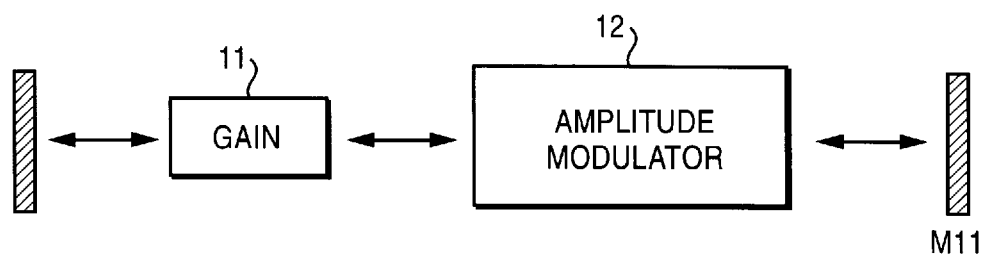
FIG. 1A is a schematic view illustrating the arrangement of a conventional single cavity Fabry-Pérot laser.
Figure 1B:
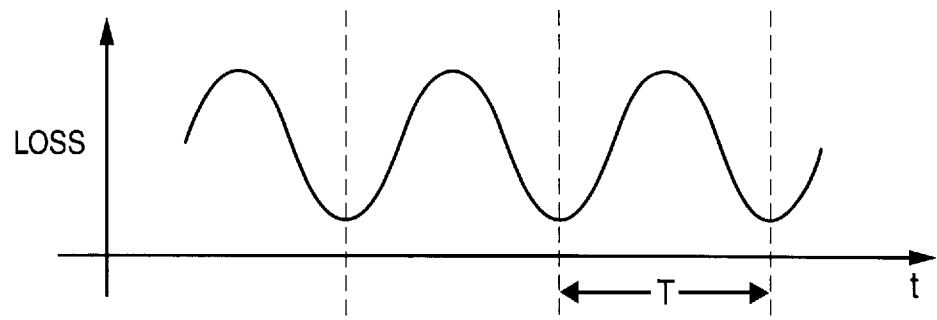
FIG. 1B is a graph depicting a periodic loss of light induced in the conventional laser.

The amplitude modulator 22 used in the dual cavity laser should simultaneously generate two modulating signals with opposite phases. That is, the mirror M20, amplifier 21, amplitude modulator 22 and mirror M21 constitute one resonator whereas the mirror M20, amplifier 21, amplitude modulator 22 and mirror M22 constitute another resonator. In other words, the dual resonator has a structure consisting of combined two resonators as shown in FIG. 1A.

In order to simultaneously obtain a mode locking in the two resonators by the single amplitude modulator 22, the lengths of the resonators should be the same. Alternatively, the length of one resonator should correspond to a multiple of the length of the other resonator.

Figure 2B:
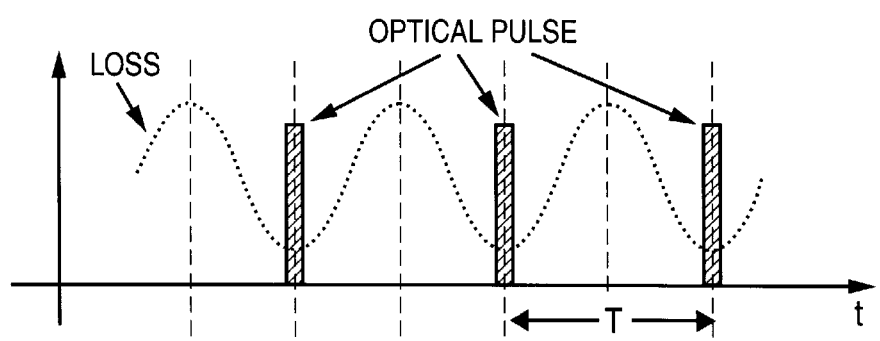
FIG. 2B is a graph showing the relationship between a loss of light occurring in one of the resonators of FIG. 2A and optical pulses generated due to the loss of light.

FIG. 2B shows the relationship between the amplitude modulating signal relating to a mode locking of one of the two resonators, namely, loss of light (indicated by the dotted line in the figure) and optical pulses generated due to the amplitude modulating signal.

Figure 2C:
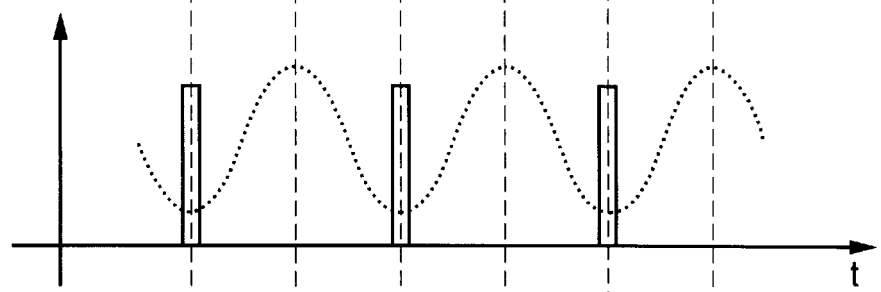
FIG. 2C is a graph showing the relationship between a loss of light occurring in the other resonator of FIG. 2A and optical pulses generated due to the loss of light.

FIG. 2C shows the relationship between the amplitude modulating signal relating to a mode locking of the other resonators, namely, loss of light (indicated by the dotted line in the figure) and optical pulses generated due to the amplitude modulating signal.

Referring to FIGS. 2B and 2C, it can be found that the phases of two amplitude modulating signals depicted by the dotted lines are opposite to each other.

The resonators have the same repetition rate because their mode locking occurs by the same amplitude modulator 22.

Figure 1C:
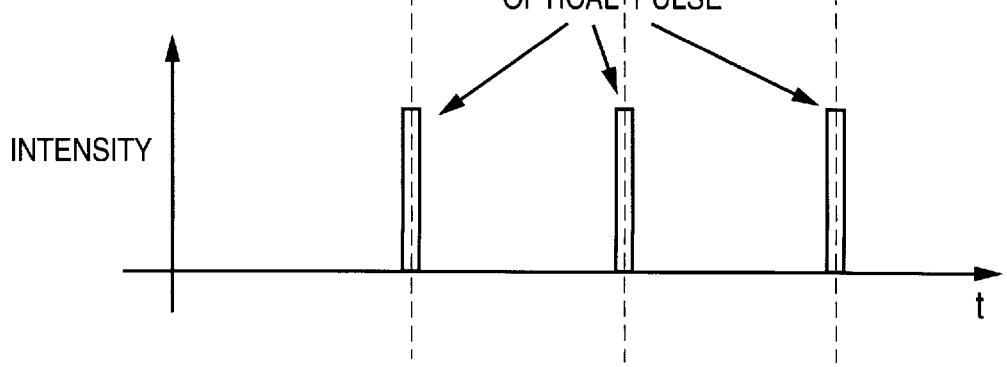
FIG. 1C is a graph showing the timing between generated optical pulses and the periodic loss of light in FIG. 1B.

However, optical pulses respectively generated from the resonators have a time difference corresponding to a half cycle (T/2) of the amplitude modulating signals because the phases of the two amplitude modulating signals, namely, loss of light depicted by the dotted lines are opposite to each other and because the mode-locked optical pulses are generated at the minima of the loss of light is minimized.

Where the mirror M21 or M22 is used as an output mirror of the dual cavity laser, it is possible to obtain a train of pulses as shown in FIGS. 2B or 2C. Each pulse train has the same repetition rate as that of the single cavity laser as shown in FIG. 1C.

These two kinds of optical pulses have unique optical characteristics, respectively, because they oscillate in different resonators while being generated from the same gain medium. For example, although they have the same coherence length because they are generated from the same gain medium, they have different states of polarization respectively. The polarized state of output optical pulses is determined by the birefringence of the laser cavity. Accordingly, if the birefringence of one of the resonators is changed at a portion of the laser where two resonators don't hold in common, it is possible to obtain two kinds of independent optical pulses with different states of polarization.

Figure 2D:
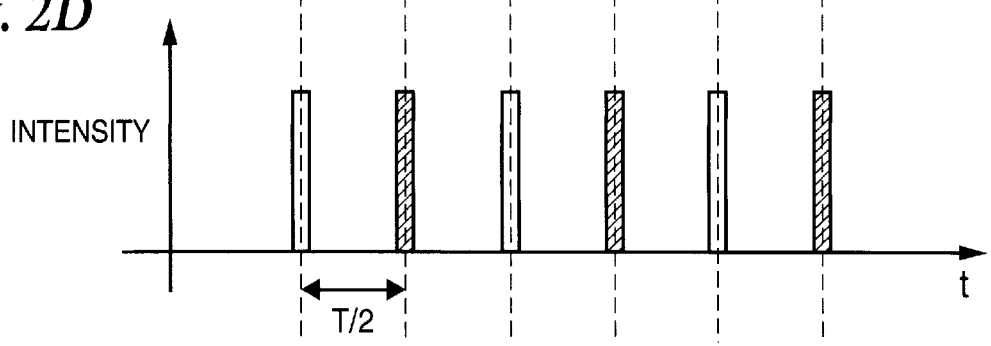
FIG. 2D is a graph depicting a train of mode-locked optical pulses emitted from the double cavity laser of FIG. 2A in accordance with the present invention.

FIG. 2D illustrates a train of mode-locked output optical pulses emitted from the dual cavity laser. Referring to FIG. 2D, it can be found that the output optical pulses of FIG. 2D consist of the optical pulses of FIGS. 2B and 2C mixed in an alternating manner. As a result, the output optical pulses generated from the dual cavity laser structure exhibit a repetition rate corresponding to two times that of the single cavity laser structure.

The optical pulse train of FIG. 2D is a train of mode-locked optical pulses emitted when the mirror M20 of the dual cavity laser is used as an output mirror.

Two kinds of optical pulses respectively generated from two resonators, namely, the optical pulses of FIGS. 2B and 2C are positioned in an alternating manner with intervals of T/2.

Therefore, the dual cavity laser structure has a repetition rate of output optical pulses corresponding to two times that of the conventional single cavity laser structure.

Consequently, actively mode-locked dual cavity laser can obtain two kinds of output optical pulses with different characteristics by appropriate selection of an output mirror.

Where the mirrors M21 and M22 of FIG. 2A are selected as output mirrors, optical pulses are generated at the same repetition rate of the single cavity laser. On the other hand, where the mirror M20 is selected as an output mirror, optical pulses are generated at a repetition rate corresponding to two times that of the single cavity laser.

It is also possible to obtain two kinds of optical pulses exhibiting different characteristics by varying optical properties of one of the resonators.

As apparent from the above description, in accordance with the present invention, it is possible to obtain two kinds of output pulses exhibiting different optical properties while doubly increasing the repetition rate of the output light by a simple modification in laser structure. The repetition rate of optical pulses is directly associated with the capacity of transferable information in the case of optical communications. Where the laser is used as a light source for optical sensors, the repetition rate of optical pulses is closely associated with the measurement sensitivity.

In this regard, the dual cavity laser of the present invention, which exhibits a repetition rate corresponding to two times that of the conventional active mode locking structure can be used as a very efficient pulse source in various technical fields associated with, for example, optical communications and optical sensors.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A dual cavity laser including a pumping unit providing population inversion of a gain medium, said dual cavity laser comprising:

first reflecting means for reflecting a light;

second reflecting means arranged in parallel to the first reflecting means;

third reflecting means arranged in parallel to the first reflecting means;

amplifying means arranged between the first reflecting means and said second and third reflecting means, the amplifying means comprising the gain medium and the pumping unit; and amplitude modulating means connected to said amplifying means and being disposed between the first reflecting means and said second and third reflecting means said amplitude modulating means being connected to the amplifying means in series, said first, second and third reflecting means, said amplifying means and said amplitude modulating means forming a pair of parallel resonators, the amplitude modulating means periodically modulating a loss of light to provide active-mode locking to increase peak power of an output of the laser, wherein said parallel resonators enable at least one of an increased repetition rate of the output pulse by at least two times the modulated frequency, producing two output optical pulses having different polarizations, or producing two output optical pulses having the same repetition rate and being shifted with respect to one another by a half period of each pulse train.

2. The dual cavity laser in accordance with claim 1, wherein a first one of the resonators comprises the first reflecting means, the second reflecting means, the amplifying means and the amplitude modulating means and a second one of the resonators comprises the first reflecting means, the third reflecting means, the amplifying means and the amplitude modulating means.

3. The dual cavity laser in accordance with claim 2, wherein said first and second resonators have the same length.

4. The dual cavity laser in accordance with claim 1, wherein the pair of resonators have different lengths, one length being a multiple of the other.

5. The dual cavity laser in accordance with claim 1, wherein the amplitude modulating means simultaneously generates two modulating signals, each of the two modulating signals having opposite phases.

6. The dual cavity laser in accordance with claim 1, wherein the resonators provide two kinds of output optical pulses respectively exhibiting different optical properties.

7. The dual cavity laser in accordance with claim 1, wherein the resonators generate two trains of optical pulses respectively exhibiting different optical properties in an alternating manner.

8. The dual cavity laser in accordance with claim 1, wherein one of the first, second or third reflecting means has a small reflection factor of less than 100%.

9. A parallel dual cavity laser, comprising:

a first reflector;

a second reflector disposed in parallel with said first reflector;

a third reflector disposed in parallel with said first reflector;

an amplifier disposed between said first reflector and said second and third reflector;

an amplitude modulator connected to said amplifier and being disposed between said first reflector and said second and third reflectors, wherein said first reflector, said amplifier, said amplitude modulator and said second reflector form a first resonator, said first reflector, said amplifier, said amplitude modulator and said third reflector form a second resonator, said first resonator being parallel to said second resonator, wherein said parallel resonators enable at least one of an increased repetition rate of the output pulse by at least two times the modulated frequency, producing two output optical pulses having different polarizations, or producing two output optical pulses having the same repetition rate and being shifted with respect to one another by a half period of each pulse train.

10. The parallel dual cavity laser in accordance with claim 9, wherein said amplifier comprises a pumping unit and a gain medium.

11. The parallel dual cavity laser in accordance with claim 9, wherein said amplitude modulator periodically modulates a loss of light to provide active-mode locking to increase an output of the laser.

12. The parallel dual cavity laser in accordance with claim 9, wherein the first and second resonators have different lengths, one length being a multiple of the other length.

13. The parallel dual cavity laser in accordance with claim 12, wherein said first and second resonators provide simultaneous mode locking in both resonators with single amplitude modulation.

14. The parallel dual cavity laser in accordance with claim 9, wherein the first and second resonators have the same length.

15. The parallel dual cavity laser in accordance with claim 9, wherein the amplitude modulator simultaneously generates two modulating signals, each of the two modulating signals having opposite phases.

16. The parallel dual cavity laser in accordance with claim 9, wherein the resonators provide two kinds of output optical pulses, each kind of optical pulse exhibiting different optical properties.

17. The parallel dual cavity laser in accordance with claim 9, wherein the resonators provide two trains of output optical pulses, each train of optical pulses alternately exhibiting different optical properties.

18. The parallel dual cavity laser in accordance with claim 9, wherein said first, second and third reflectors are mirrors.

19. The parallel dual cavity laser in accordance with claim 18, wherein one of the first, second and third reflectors has a small reflection factor of less than 100%.

* * * * *